US009363128B2

(12) United States Patent
Downey

(10) Patent No.: US 9,363,128 B2
(45) Date of Patent: Jun. 7, 2016

(54) METHOD AND APPARATUS FOR PHASE-BASED MULTI-CARRIER MODULATION (MCM) PACKET DETECTION

(71) Applicant: Echelon Corporation, San Jose, CA (US)

(72) Inventor: Walter J. Downey, Los Gatos, CA (US)

(73) Assignee: ECHELON CORPORATION, San Jose, CA (US)

(*) Notice: Subject to any disclaimer, the term of this patent is extended or adjusted under 35 U.S.C. 154(b) by 0 days.

(21) Appl. No.: 13/838,211

(22) Filed: Mar. 15, 2013

(65) Prior Publication Data

US 2014/0269949 A1 Sep. 18, 2014

(51) Int. Cl.

| | |
|---|---|
| ***H04L 27/06*** | (2006.01) |
| ***H04L 27/26*** | (2006.01) |
| ***H04L 1/00*** | (2006.01) |
| ***H04L 27/233*** | (2006.01) |

(52) U.S. Cl.

CPC .......... *H04L 27/2649* (2013.01); *H04L 1/0039* (2013.01); *H04L 27/233* (2013.01); *H04L 27/2613* (2013.01); *H04L 27/2656* (2013.01); *H04L 27/2657* (2013.01); *H04L 27/2692* (2013.01)

(58) Field of Classification Search

CPC ............ H04L 27/2657; H04L 27/2649; H04L 27/2656; H04L 27/2692; H04L 1/0039

USPC ......................................... 375/340, 260, 226

See application file for complete search history.

(56) References Cited

U.S. PATENT DOCUMENTS

| | | | | |
|---|---|---|---|---|
| 4,833,694 | A | 5/1989 | Young et al. | |
| 5,457,710 | A * | 10/1995 | Miyo et al. | 375/340 |
| 5,840,448 | A * | 11/1998 | Borodovsky et al. | 430/5 |
| 5,883,923 | A * | 3/1999 | Shimazaki | 375/225 |
| 6,038,253 | A * | 3/2000 | Shimazaki | 375/224 |
| 6,101,230 | A * | 8/2000 | Chun et al. | 375/355 |
| 6,175,600 | B1 * | 1/2001 | Guillemain et al. | 375/326 |
| 6,246,717 | B1 * | 6/2001 | Chen et al. | 375/226 |
| 6,563,885 | B1 * | 5/2003 | Magee et al. | 375/316 |
| 6,778,622 | B2 * | 8/2004 | Bombay | 375/371 |
| 6,865,232 | B1 * | 3/2005 | Isaksson et al. | 375/260 |
| 6,907,272 | B2 * | 6/2005 | Roy | 455/562.1 |
| 6,928,120 | B1 * | 8/2005 | Zhang | 375/260 |
| 7,009,932 | B2 * | 3/2006 | Matheus et al. | 370/208 |

(Continued)

OTHER PUBLICATIONS

Alexandre Skrzypczak, et al., "Application of the OFDM/OQAM Modulation to Power Line Communications", Mar. 26, 2007, 6 pages, IEEE.

(Continued)

*Primary Examiner* — Emmanuel Bayard

(74) *Attorney, Agent, or Firm* — Nicholson De Vos Webster & Elliott LLP

(57) ABSTRACT

A method is disclosed for detecting packet at a receiving system in a Multi-Carrier Modulation (MCM) system. The method starts with receiving a signal at the receiving system. Then during the plurality of symbol durations, a set of phases of the signal for each symbol duration is obtained, where each phase is a phase of a carrier of the number of carriers. Then a set of phase variances for each carrier of the number of carriers is obtained, where each phase variance is a difference of phases of a carrier in different symbol durations. Then a phase variance value based on the set of phase variances is computed and it is compared with a threshold to determine whether a packet has been detected from the received signal.

22 Claims, 9 Drawing Sheets

PERFORM A DISCRETE FOURIER TRANSFORM (DFT) ON A RECEIVED SIGNAL. 602
COMPUTE A SET OF ANGLES FOR CARRIERS BASED ON THE RESULT OF THE DFT. 604
COMPUTE A SET OF MEAN ANGLES FOR EACH CARRIER OVER A NUMBER OF PAST SYMBOLS. 606
COMPUTE A SET OF PHASE VARIANCES, EACH PHASE VARIANCE BEING A DIFFERENCE BETWEEN AN ANGLE AND ITS CORRESPONDING MEAN ANGLE OF A CARRIER. 608
REMOVE A SUBSET FROM THE SET OF PHASE VARIANCES, THE SUBSET CONTAINS THE LARGEST PHASE VARIANCE VALUES. 610
COMPUTE A PHASE VARIANCE SUM BASED ON THE RESULTING SET OF PHASE VARIANCES AFTER REMOVING THE SUBSET. 612
COMPARE THE PHASE VARIANCE SUM TO A THRESHOLD TO DETERMINE WHETHER A PACKET HAS BEEN DETECTED. 614
NO PACKET HAS BEEN DETECTED. 620
COMPUTE SYMBOL OFFSET TO DETERMINE SYMBOL SYNCHRONIZATION WHEN PACKET HAS BEEN DETECTED. 616

(56) References Cited

U.S. PATENT DOCUMENTS 7,061,997 B1 * 6/2006 Eberlein et al. ............... 375/332
7,206,279 B2 * 4/2007 Taga et al. ..................... 370/208
7,269,125 B2 * 9/2007 Smallcomb ................... 370/208
7,280,621 B1 10/2007 Murphy
7,302,024 B2 * 11/2007 Arambepola ................. 375/347
7,346,098 B2 * 3/2008 Chen et al. .................... 375/150
7,496,340 B1 * 2/2009 Chen et al. .................... 455/296
7,548,587 B2 * 6/2009 Zhang ........................... 375/260
7,668,252 B2 * 2/2010 Sandell et al. ................ 375/267
7,668,260 B2 * 2/2010 Arambepola ................. 375/316
7,679,555 B2 * 3/2010 Dai et al. ................. 342/357.31
7,696,922 B2 * 4/2010 Nicholson et al. ....... 342/357.58
7,697,617 B2 * 4/2010 Ray .............................. 375/260
7,710,857 B2 * 5/2010 Yousef .......................... 370/208
7,853,418 B2 * 12/2010 Mikkonen ....................... 702/66
7,957,474 B2 * 6/2011 Waters et al. ................. 375/260
7,971,108 B2 * 6/2011 Zopf et al. .................... 714/704
8,054,914 B2 * 11/2011 Waters et al. ................. 375/316
8,073,079 B1 * 12/2011 Ahmed ......................... 375/324
8,229,010 B2 * 7/2012 Adachi et al. ................. 375/260
8,270,509 B2 * 9/2012 Lindoff et al. ................ 375/260
8,320,233 B2 11/2012 Razazian et al.
8,358,644 B2 * 1/2013 Baxley et al. ................. 370/350
8,454,528 B2 * 6/2013 Yuen et al. .................. 600/534
8,477,888 B2 * 7/2013 Lu et al. ........................ 375/346
8,483,301 B2 * 7/2013 Ray .............................. 375/260
8,494,011 B2 * 7/2013 Barry et al. ................... 370/516
8,503,592 B2 * 8/2013 Strait ............................ 375/354
8,515,292 B2 * 8/2013 Xu ........................ H04L 27/223
398/202
8,537,934 B2 * 9/2013 Joshi et al. .................... 375/326
8,594,153 B2 * 11/2013 McDermott .................. 375/146
8,665,976 B2 * 3/2014 Bhat et al. ..................... 375/260
8,675,753 B2 * 3/2014 Strait ............................ 375/260
8,705,676 B2 * 4/2014 Ayrapetian et al. ........... 375/355
8,830,121 B2 * 9/2014 Vollath ..................... 342/357.27
8,873,666 B2 * 10/2014 Kakishima et al. ........... 375/267
8,929,749 B2 * 1/2015 Roberts et al. ................ 398/208
2002/0065047 A1 * 5/2002 Moose ............................ 455/63
2003/0021336 A1 1/2003 Iwasaki
2003/0123491 A1 * 7/2003 Couillard ...................... 370/508
2004/0114675 A1 * 6/2004 Crawford ...................... 375/149
2004/0125894 A1 * 7/2004 Nakamura et al. ............ 375/326
2004/0142728 A1 * 7/2004 Tari et al. ...................... 455/561
2004/0258144 A1 * 12/2004 Omori .................. H04B 17/336
375/224
2005/0111530 A1 * 5/2005 Chen et al. .................... 375/150
2006/0067438 A1 * 3/2006 Menkhoff et al. ............ 375/343
2006/0133259 A1 * 6/2006 Lin et al. ....................... 370/208
2006/0209979 A1 * 9/2006 Sandell et al. ................ 375/267
2007/0030931 A1 * 2/2007 Arambepola ................. 375/346
2007/0127358 A1 * 6/2007 Sun et al. ...................... 370/203
2007/0133586 A1 6/2007 Ojard et al.
2007/0263712 A1 * 11/2007 Ling et al. ..................... 375/227
2008/0043649 A1 * 2/2008 Bhukania et al. ............. 370/310
2008/0095384 A1 * 4/2008 Son et al. ..................... 381/94.1
2008/0123746 A1 * 5/2008 Ueda et al. ............... 375/240.16
2008/0168839 A1 * 7/2008 Katsuyama ..................... 73/602
2008/0317150 A1 12/2008 Alexander et al.
2009/0097577 A1 * 4/2009 Adachi et al. ................. 375/260
2009/0304133 A1 12/2009 Umari et al.
2010/0195772 A1 8/2010 Kodama et al.
2010/0202552 A1 * 8/2010 Sakai et al. ................... 375/267
2011/0022904 A1 * 1/2011 Zopf et al. .................... 714/704
2011/0181510 A1 * 7/2011 Hakala et al. ................. 345/158
2011/0305198 A1 * 12/2011 Aue et al. ...................... 370/328
2012/0250799 A1 * 10/2012 Bhat et al. ..................... 375/329
2013/0089342 A1 * 4/2013 Oveis Gharan et al. ...... 398/208
2013/0243062 A1 * 9/2013 Raju et al. ..................... 375/226
2013/0285748 A1 * 10/2013 Hongo .......................... 330/291
2014/0269948 A1 9/2014 Downey
2014/0334560 A1 * 11/2014 Yanagisawa et al. ......... 375/257

OTHER PUBLICATIONS

Kaveh Razazian, et al., "G3-PLC Specification for Powerline Communication: Overview, System Simulation and Field Trial Results", Mar. 28, 2010, 6 pages, IEEE.

Office Action from U.S. Appl. No. 13/837,947, mailed Jun. 18, 2014, 13 pages.

Notice of Allowance from U.S. Appl. No. 13/837,947, mailed Feb. 25, 2015, 10 pages.

Office Action from U.S. Appl. No. 13/837,947, mailed Nov. 18, 2014, 15 pages.

European Search Report (Application 14159668.4), Jul. 29, 2015, 7 pages.

Lott, M., Comparison of Frequency and Time Domain Differential Modulation in an OFDN system for wireless ATM, 49th Vehicular Technology Conference, May 16, 1999, p. 877-883, IEEE US.

* cited by examiner

200

METHOD AND APPARATUS FOR PHASE-BASED MULTI-CARRIER MODULATION (MCM) PACKET DETECTION

RELATED APPLICATION

This application is related to co-pending U.S. patent application Ser. No. 13/837,947, entitled "Method and Apparatus for Multi-Carrier Modulation (MCM) Packet Detection Based on Phase Differences," filed Mar. 15, 2013, which is incorporated by reference herein in its entirety.

FIELD OF THE INVENTION

The invention relates to signal processing in a communication system. Specifically, it relates to packet detection in a Multi-Carrier Modulation (MCM) system.

PRIOR ART AND RELATED ART

Multi-Carrier Modulation (MCM) is a method of encoding digital data on multiple carrier frequencies. MCM has been utilized in a wide variety of communication systems, such as wireless or radio frequency (RF) systems, copper wire system, and power line communication (PLC) systems. In an MCM system, a number of carriers (sometimes referred to as carrier signals, the two terms are used interchangeably within this specification) are used to carry data on several parallel data streams or channels. Each carrier is modulated with a modulation scheme (such as quadrature amplitude modulation or phase-shift keying) at a lower symbol rate, maintaining total data rates similar to conventional single-carrier modulation schemes in the same bandwidth. When the carriers are orthogonal to each other in an MCM system, the MCM system is generally referred to as an Orthogonal Frequency-Division Multiplexing (OFDM) system. Because OFDM systems are the most popular forms of MCM systems so far, all MCM systems with non-orthogonal carriers are often referred to as non-OFDM MCM systems or simply non-OFDM systems.

In designing an MCM receiving system, finding a cost-effective carrier detection scheme is often a challenge, particularly when the MCM receiving system is required to be low cost or low power thus cannot implement a powerful processor. Thus, correlation-based carrier detection known in the art may not be viable in this kind of MCM receiving systems and new ways of carrier and packet detection is needed.

SUMMARY OF THE INVENTION

A method is disclosed for detecting packet at a receiving system in a Multi-Carrier Modulation (MCM) system. The method starts with receiving a signal at the receiving system. Then during the plurality of symbol durations, a set of phases of the signal for each symbol duration is obtained, where each phase is a phase of a carrier of the number of carriers. Then a set of phase variances for each carrier of the number of carriers is obtained, where each phase variance is a difference of phases of a carrier in different symbol durations. Then a phase variance value based on the set of phase variances is computed and it is compared with a threshold to determine whether a packet has been detected from the received signal.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Figure 1:
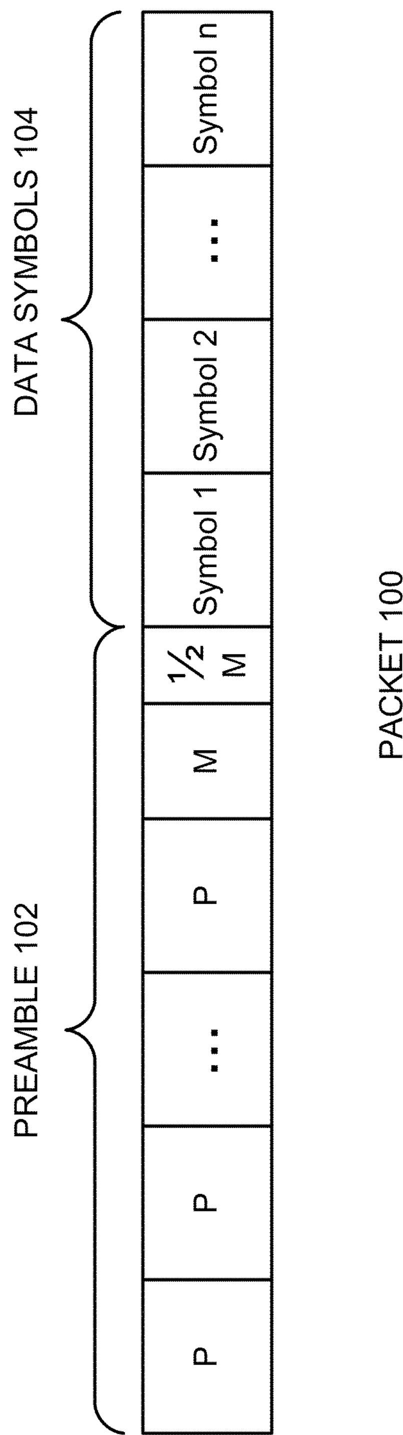
FIG. 1 illustrates a data frame structure used for data transmission in a Multi-Carrier Modulation (MCM) system.

FIG. 1 illustrates a data frame structure used for data transmission in a Multi-Carrier Modulation (MCM) system. Packet 100 includes preamble 102 with a number of P symbols and 1½ M symbols. In one embodiment, there are 8 P symbols in preamble 102. P symbols may be used for symbol synchronization, channel estimation, initial phase reference estimation, and automatic gain control (AGC). For M symbols, two types of symbol may be used. One is the M1 in which all the carriers may be $\pi$ phase shifted and the other one is M2 in which all the carriers may be $\pi/2$ phase shifted. At the receiver, the phase distance between symbol P and symbol M waveforms may be used for packet frame synchronization purpose.

The preamble consists of a set of unmodulated carriers (or carriers without modulation, the two terms are used interchangeably within the specification) transmitted within a duration of multiple symbol times. The frequencies of these carriers generally are multiples of some base frequency and each carrier may contain a different initial phase. Preamble 102 is transmitted before data symbols 104, which contains a number of symbols. Data symbols 104 may not use the same set of carriers as the preamble 102. In addition, data symbols 104 use modulated carrier though modulation schemes such as phase-shifting keying (PSK).

Note that data symbols 104 are generally modulated using square wave phase modulation in an OFDM system. In a non-OFDM MCM system, data symbols 104 uses other phase modulation such as Nyquist shaped phase modulation. For packet detection/synchronization, the focus is on the preamble—detecting its carriers and their phases while the differences of data symbol modulation schemes between an OFDM and non-OFDM MCM system are of little concern. Thus, while embodiments of the inventions herein are often disclosed using OFDM systems only as examples, the embodiments of the inventions may be used in other non-OFDM MCM systems as well.

Packet 100 is sent from an MCM transmitting system, going through a transmission channel (e.g., wireless/RF channel, copper wire, or a power line), and arrived at an MCM receiving system. In designing an MCM receiving system, the goal should be to make data decoding function, not packet detection/synchronization function, be the limiting factor on whether or not a packet is successfully decoded. This should be achievable since packets can be designed so that there is more redundancy in the preamble section than the data symbol section, thus data error should limit packet reception. Yet, an MCM receiving system using correlation-based carrier detection techniques known in the art may not be able to achieve the goal due to several drawbacks.

A correlation-based carrier detection technique tends to be computationally intensive. A correlation requires $N^2$ multiple-accumulates for an N-point symbol. For an MCM receiving system required to be low cost or low power (e.g., a power line modem), a digital signal processing (DSP) processor with less computing power is desirable. Yet a DSP processor with less computing power may not be able to perform computationally expensive algorithm like $N^2$ multiple-accumulates.

In addition, the output value of a correlation-based detection is generally a function of packet amplitude. Packet amplitude sometimes varies over an extremely wide range and is unknown at the time the algorithm is in play. For example, in a power line communication (PLC) system, the packet amplitude varies over a range of 80 dB. In addition, the output value also varies with noise level, which is unknown because it varies over time. Proper detection involves knowing what level of correlation out to expect which requires normalization or estimates of packet levels. Techniques are known in the art to estimate the packet level, but they are not desirable and poor estimate causes performance issues.

Furthermore, in some systems, correlation values in the presence of certain noises are poor. For example, in a PLC system, the correlation values are poor for certain types of noises commonly found on the power line (e.g., large harmonically rich tones). In these cases, the packet waveform can be dominated by a few impairment harmonics such that very low correlations result.

With the drawbacks discussed above, correlation-based carrier detection is not suitable for PLC systems or other systems sharing the characteristics of PLC systems (e.g., requiring low-power or low-cost receiving systems, having wide range or unknown amplitude packet amplitude, and/or noise correction values being low). Thus, a new approach of preamble carrier detection and symbol offset determination for packet detection is needed.

As shown in FIG. 1, MCM packets are composed of many symbols, each of which contains a multiplicity of carriers. The carrier frequencies chosen are usually all multiples of a single frequency $f_0$ which is chosen to be the inverse of the computed symbol time $T_s$. A judicious choice combined with picking the input sample rate of a receiving system to be a binary multiple N of $T_s$ allows the demodulation of the symbols to be accomplished with the use of a discrete Fourier Transform (DFT). The DFT is commonly implemented as a fast Fourier Transform (FFT), although other DFT methods may be utilized. Note that the actual symbol time $T_A$ can be extended to be longer than $T_s$ by adding a cyclic prefix to allow for dispersion in the channel, but the transform is computed using a subset of N points.

When a binary phase-shift keying (BPSK) modulation is used, data is encoded by square wave phase modulating each carrier with a peak-to-peak deviation of π radians around some chosen reference phase $\theta_k$. Thus the nth symbol could be represented mathematically as function of time t by $$S_n = \sum_{k=c_0}^{c_0+n_c-1} A_k e^{j(2\pi f_0 kt+\theta_k+\pi d_{k,n})}$$

where $c_0$ is the number of the first of $n_c$ carriers and $d_{k,n}$ is the binary data for the $k^{th}$ carrier of the $n^{th}$ symbol.

At the receiving system, decoding of these symbols requires that a valid packet has been detected and that the symbol boundaries have been determined. As illustrated in FIG. 1, a preamble is usually pre-pended to the data section of the packet to facilitate this packet detection and synchronization. The number of constant non-modulated P-symbols may (although not must) use a same frequency carrier set as the data portion of the packet. This has the advantage of having a very similar frequency energy distribution as the data section of the packet and being unique enough that it can be distinguished from other non-packet energy (e.g. noise or interference) that can exist on the channel. So the $n^{th}$ P-symbol can be represented by $$P_n = \sum_{k=c_0}^{c_0+n_c-1} A_k e^{j(2\pi f_0 tk+\theta_k)}$$

which is essentially a data symbol except all the data values have been set to zeros.

Figure 2:
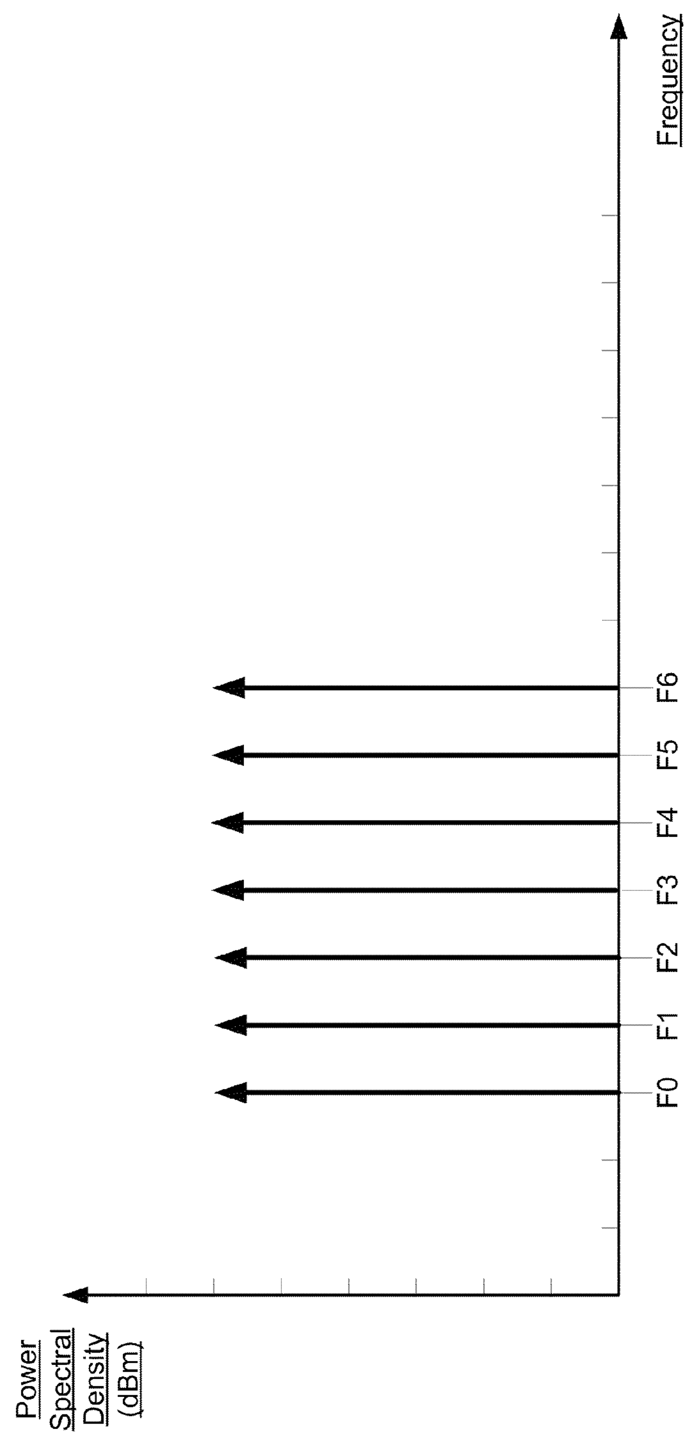
FIG. 2 illustrates a number of unmodulated carriers in a Multi-Carrier Modulation (MCM) system.

FIG. 2 illustrates a number of unmodulated carriers in an Multi-Carrier Modulation (MCM) system. In FIG. 2, seven carriers (F0-F6) are utilized for preamble symbols. The seven unmodulated carriers are evenly spaced into frequency bands and they may have the same power spectral density.

The number of carriers for the preamble of an MCM system is often affected by regulations in various countries and standardization bodies. For example, for power line communication (PLC) system, only certain frequency bands of the power line are allowed to be used for communication. Various standardization bodies are involved in regulations of frequency bands: Federal Communication Commission (FCC) in the United States, Association of Radio Industries and Businesses (ARIB) in Japan, and European Committee for Electrotechnical Standardization (CENELEC) in Europe. Table 1 illustrates various frequency bands for PLC system per standardization bodies.

TABLE 1

| FCC, ARIB, and CENELEC Bands | | |
|---|---|---|
| | Frequency Low (KHz) | Frequency High (KHz) |
| FCC | 10 | 480 |
| ARIB | 10 | 450 |
| CENELEC A | 9 | 95 |
| CENELEC B | 95 | 125 |
| CENELEC C | 125 | 140 |
| CENELEC B, C | 95 | 140 |

Under these regulations, the number of carriers allowable in each frequency band is a constraint. In one embodiment of an OFDM system, it is assumed that the maximum spectral content of signals is 480 KHz, the sampling frequency at the transmitter and receiver may be selected to be 1.2 MHz that is about 240 KHz above the Nyquist rate to provide a sufficient margin. A fast Fourier Transform (FFT) may be implemented for DFT and 256 frequency bins may be selected, which results in a frequency resolution for the OFDM carriers equal to 4.6875 KHz (Fs/N).

Table 2 illustrates the number of allowable carriers for various frequency bands per standardization bodies in one embodiment under the assumption. For an OFDM receiving system (e.g., a PLC modem) regulated under FCC or ARIB, preambles with a large number of carriers (e.g., higher than 18) can be deployed freely. Yet, the same OFDM receiving system may not be deployed in Europe at CENELEC B and/or C bands. In this specification, a small number of carriers is defined as no higher than 18. While the embodiments of this invention may be utilized in an OFDM system with a larger number of carriers, as discussed herein below, using embodiments of the invention in an OFDM system with small carrier sets has additional benefits comparing to using it in an OFDM system with a larger carrier set. Note a non-OFDM MCM system has similar constraints on the number of carriers allowed in frequency bands and embodiments of this invention may be utilized in the non-OFDM MCM system as well.

TABLE 2

| Number of Carriers for Various Bands | | | |
|---|---|---|---|
| | Number of Carriers | First Carrier (KHz) | Last Carrier (KHz) |
| FCC | 100 | 14.063 | 478.125 |
| ARIB | 93 | 14.0625 | 445.3125 |
| CENELEC A | 19 | 9.375 | 93.75 |
| CENELEC B | 6 | 98.4375 | 121.875 |
| CENELEC C | 3 | 126.5625 | 135.9375 |
| CENELEC B, C | 9 | 98.4375 | 135.9375 |

Figure 3:
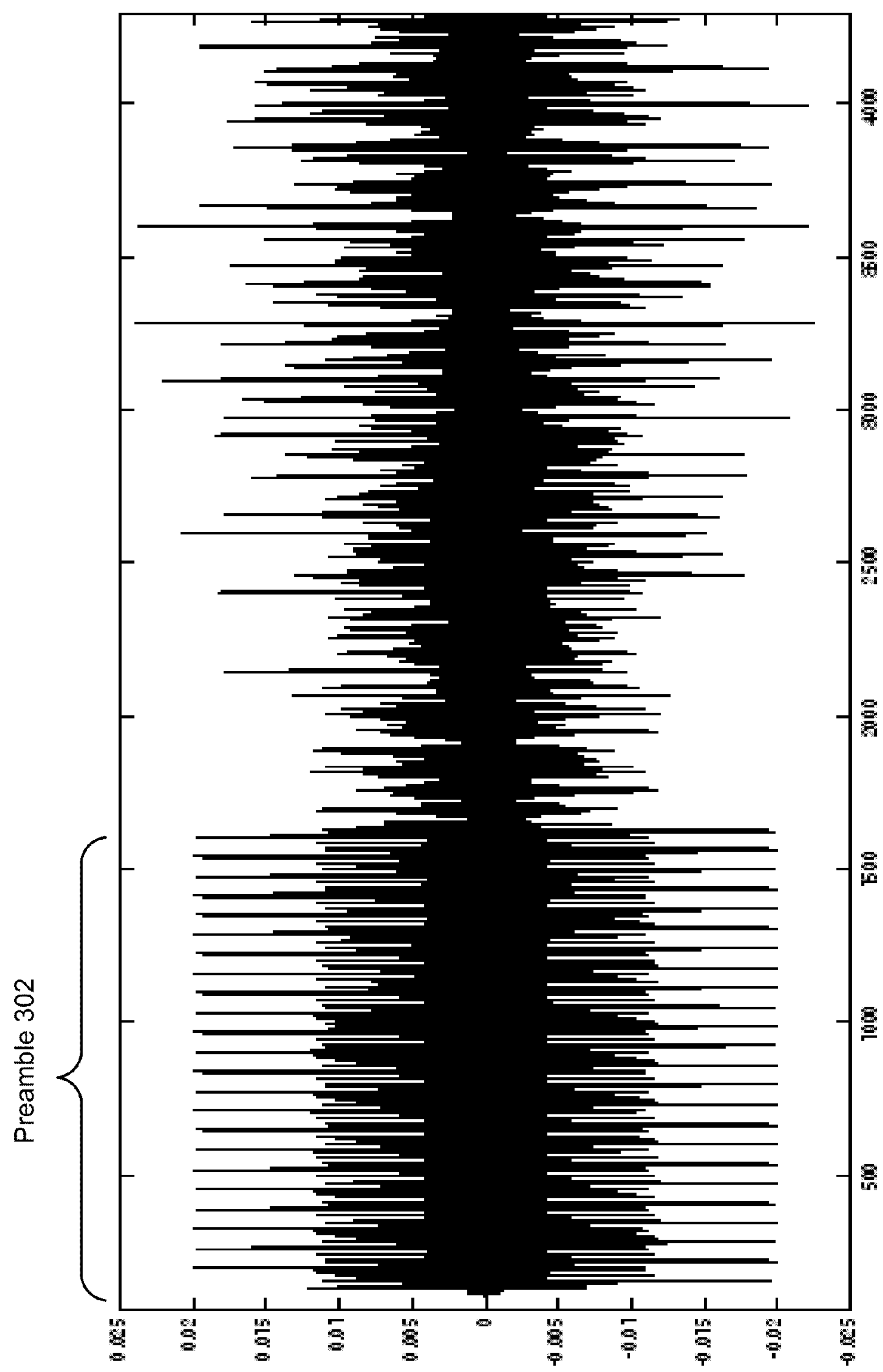
FIG. 3 illustrates a snapshot of an OFDM packet in an orthogonal frequency-division multiplexing (OFDM) system.

FIG. 3 illustrates a snapshot of an OFDM packet in an orthogonal frequency-division multiplexing (OFDM) system. The packet has preamble 302 consisting of 7 carriers. Each symbol of preamble 302 has consistent waveforms. The data symbols 304 vary widely in their waveforms.

Figure 4:
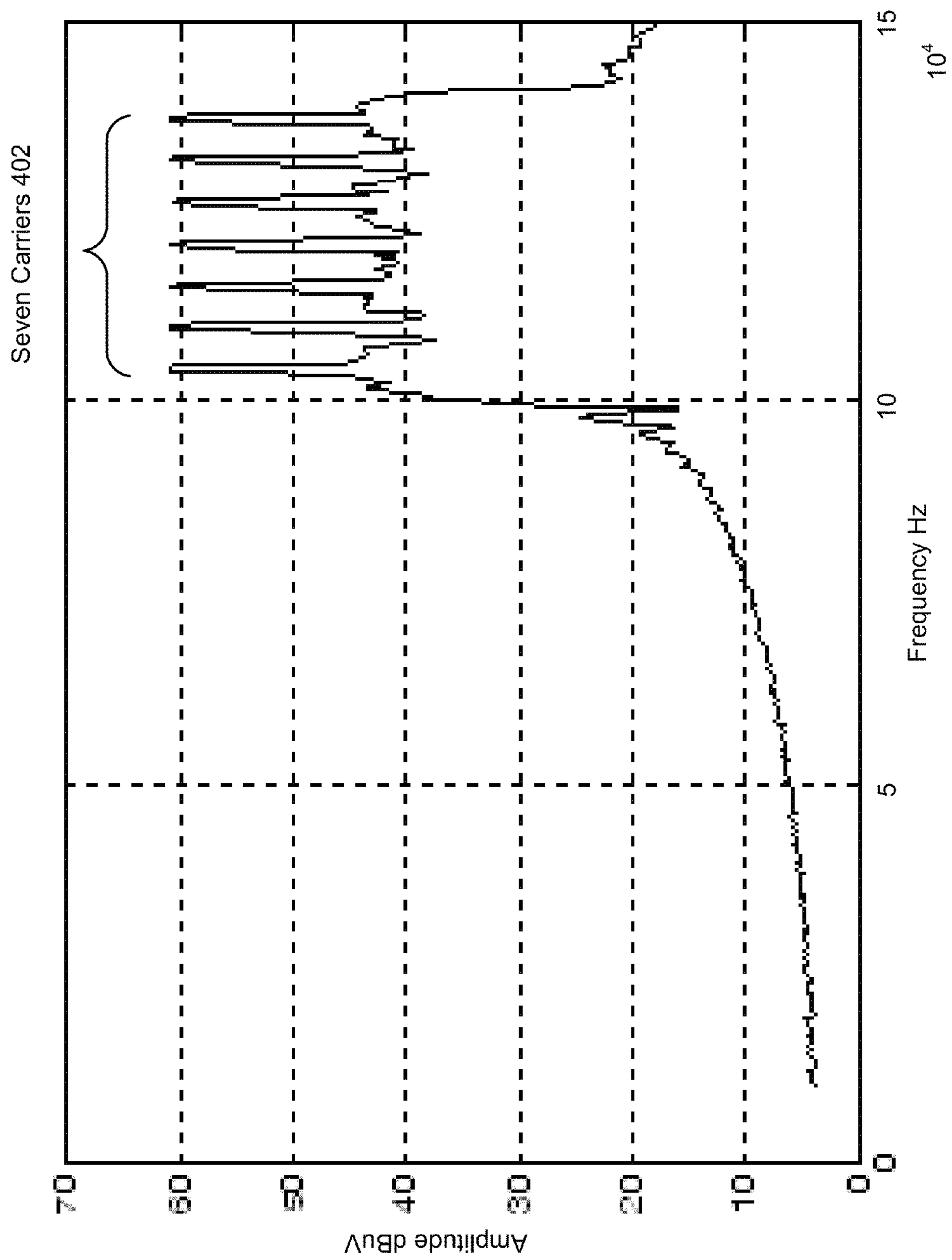
FIG. 4 illustrates a close-up view of the preamble of an OFDM packet in an orthogonal frequency-division multiplexing (OFDM) system.

FIG. 4 illustrates a close-up view of the preamble of an OFDM packet in an orthogonal frequency-division multiplexing (OFDM) system. A fast Fourier Transform (FFT) has been performed on the preamble of an OFDM packet illustrated in FIG. 3 and the close-up view of FIG. 4 is the FFT of the preamble. The seven carriers 402 have consistent power spectrum density.

When impairments consisting of multiple large in-band harmonics are added to the spectrum of preamble carriers, up to several of the phase differences will be affected. Slightly larger than the packet carrier amplitude, the impairments harmonics will dominate those few phase measurements which are near the carrier bins. As disclosed in the co-pending U.S. patent application with title and authorship disclosed in the paragraph 0001 of this specification, the impacts of a few carriers does not prevent the embodiments disclosed in the co-pending U.S. patent application from performing properly as there are many phase differences can be utilized.

However, when the number of preamble carriers is smaller (e.g., no higher than 9) relative to the number of in-band harmonics found in common impairments, the computation disclosed in the co-pending U.S. patent application can be dominated by the impairment's harmonics. For example, assume there is an MCM system where the number of preamble carriers is seven as illustrated in FIG. 2 (e.g., the MCM system is a PLC modem utilizing OFDM operating in CENELEC bands B+C) and the in-band harmonics interferes with F2 and F4. With seven carriers, there are six phase differences between adjacent carriers. Of the six phase differences, four phase differences are distorted by in-band harmonics interferences (F1-F2, F2-F3, F3-F4, and F4-F5), and only two phase differences are intact (F0-F1 and F5-F6). With only two out of six phase differences being undistorted, the computation can be ineffective. Note the embodiments disclosed in the co-pending U.S. patent application can still be used in an MCM system with small carrier sets in many scenarios such as when the number of preamble carriers is not toward lower end of the range (e.g., less than 7) or when in-band harmonics are not dominating otherwise.

A new approach of carrier detection depends on there being valid carriers present but the approach is preferably less sensitive to a higher percentage of interfering harmonics. Thus in the new approach, instead of relying on phase differences between carriers, one may explores the property that the absolute phase angles are constant for a given offset r for unimpaired carriers. Thus, using the example of the immediately preceding paragraph again, when there are seven preamble carriers (F0-F6) and the in-band harmonics interferes with F2 and F4, by measuring the absolute phase angles of each carriers, the in-band harmonics now interfere with only two (F2 and F4) out of seven sample points, instead of four out of six. Thus measuring the absolute phase angles of each carrier (instead of phase differences of carriers) is less sensitive to interfering harmonics. In addition, one may identify the distorted carriers from the measurement of the absolute phase angles, thus uses only undistorted carriers for preamble carrier detection.

For the frequency bins dominated by the valid packet carriers, the measured phase angles will be constant during the preamble. So for noiseless packets the standard deviation of the angles of all carrier frequency bins angle should be zero when taken over several symbol times. However, those frequency bins dominated by harmonics from an impairment will most likely have a high standard deviation. If one were to allow for the presence of some impairment harmonics by excluding those measurements with too high a standard deviation, then the overall carrier detection calculation will not be overly effected by these types of impairments. Note the approach can be used for an MCM packet detection and synchronization for both small and large carrier sets. While the approach may not be needed when the impairment caused by impairment is "averaged out" in an MCM system with a large carrier sets using embodiments of invention disclosed in the co-pending U.S. patent application, the computation based on constant phase through this approach can be utilized too.

Figure 5:
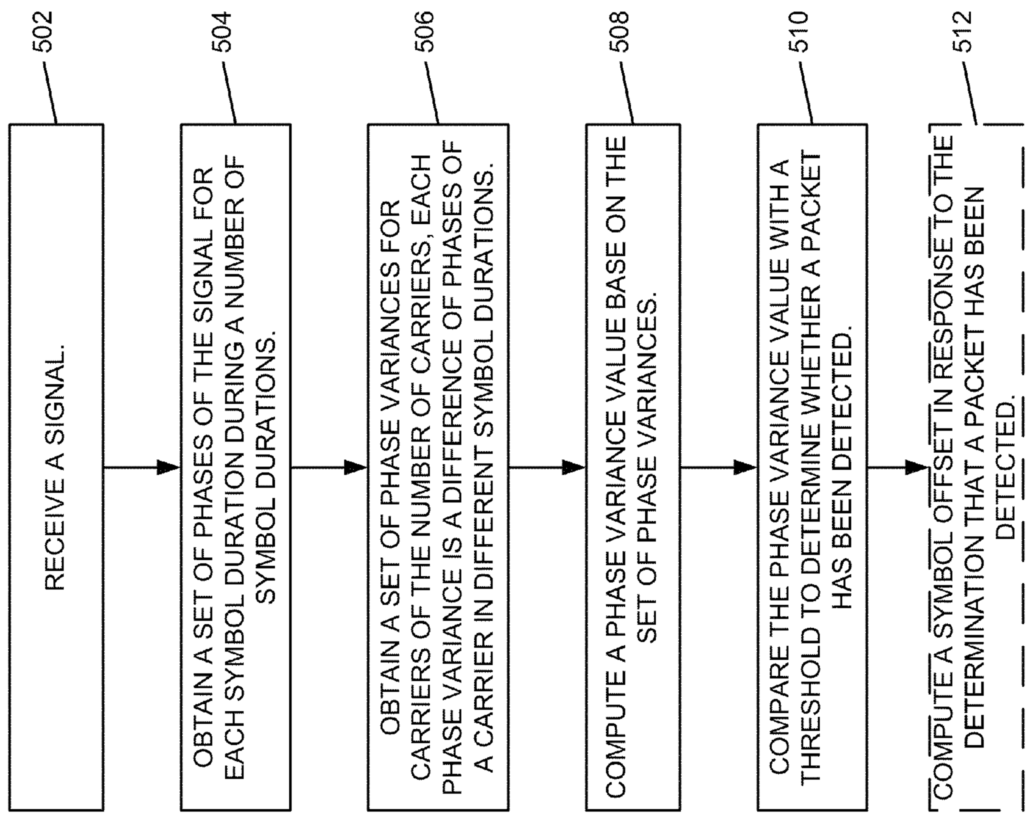
FIG. 5 illustrates a method of MCM packet detection according to one embodiment of the invention.

FIG. 5 illustrates a method of MCM packet detection according to one embodiment of the invention. Method 500 may be implemented in an MCM receiving system such as a PLC modem or any other system that shares characteristics of a PLC system. When the MCM receiving system is a PLC system, it may utilize frequency bands within 95-140 kHz in compliance with CENELEC standards. In an MCM system, data traffic is formatted as MCM packets (e.g., OFDM packets) to transmit through a transmission channel. The transmission channel may be a wireless/RF channel, copper wire, a power line, or others. An MCM packet includes a preamble, which consists of a set of carriers without modulation, and each carrier contains an initial phase. The set of carriers is transmitted in a number of symbol durations.

Method 500 starts at reference 502 with receiving a signal at the MCM receiving system. The signal may be obtained from sampling the transmission channel. Then the MCM receiving system obtains a set of phases of the signal at reference 504. The set of phases contains a phase of each carrier in one symbol duration, and each carrier may contain a number of phases, depending on the number of symbol durations selected. For example, for an MCM receiving system consists of m carriers and p symbol duration selected, the set of phases includes m×p phases.

Then at reference 506, a set of phase variances for carriers of the set of carriers is obtained. Each phase variance is a difference of phases of a carrier in different symbol durations. In one embodiment, the set of phase variances includes all carriers of the set of carriers. In another embodiment, only a subset of the set of phase variances is obtained. In one embodiment, each phase variance is a difference of phases in adjacent symbol durations. The phase variances may be computed in a variety of ways. In one embodiment, the phase variance is computed as an absolute value of differences of phases of the carriers in different symbol durations. In another embodiment, the phase variance is computed as a root mean square (RMS) value of the carrier in different symbol durations.

At reference 508, a phase variance value based on the set of phase variances is calculated. The phase variance value may be computed through forming a weighted average of the set of phase variances, and then a deviation from the weighted average of the set of phase variance may be further computed. The phase variance value may be computed with subset of the set of phase variances. In other words, phase variances for some carriers may be excluded when computing the phase variance value. For example, phase variances for some carriers is ignored when the phase variances deviates from other phase variances in some way (e.g., the two largest phase variances out of seven phase variances are ignored for a seven-carrier MCM system).

Then at reference 510, the computed phase variance is compared to a threshold to determine whether a packet has been detected from the received signal. If the computed phase variance is below the threshold, method 500 may determine that a packet has been detected; otherwise the receiving system will continue monitoring the transmission channel for a packet.

After it is determined that a packet has been detected, method 500 may continue at reference 512 and compute a symbol offset. The computed symbol offset indicates a number of sample points from a beginning of a symbol. With a determination of packet detection and symbol offset, method 500 can decode the preamble and thus decode the data carried in the MCM packet. The symbol offset computation may include forming a weighted average of phase differences between some number of carriers in the preamble. In one embodiment, the phase differences are a set of phase differences between adjacent carriers in the preamble.

Note method 500 can be implemented in numerous ways depending on factors such as the characteristics of the MCM system, hardware/software constraints of system design and preference of embodiments. Also, while method 500 is desirable for an MCM system with smaller carrier sets (no higher than 18), the method 500 can be utilized in an MCM system with larger carrier sets.

Figure 6:
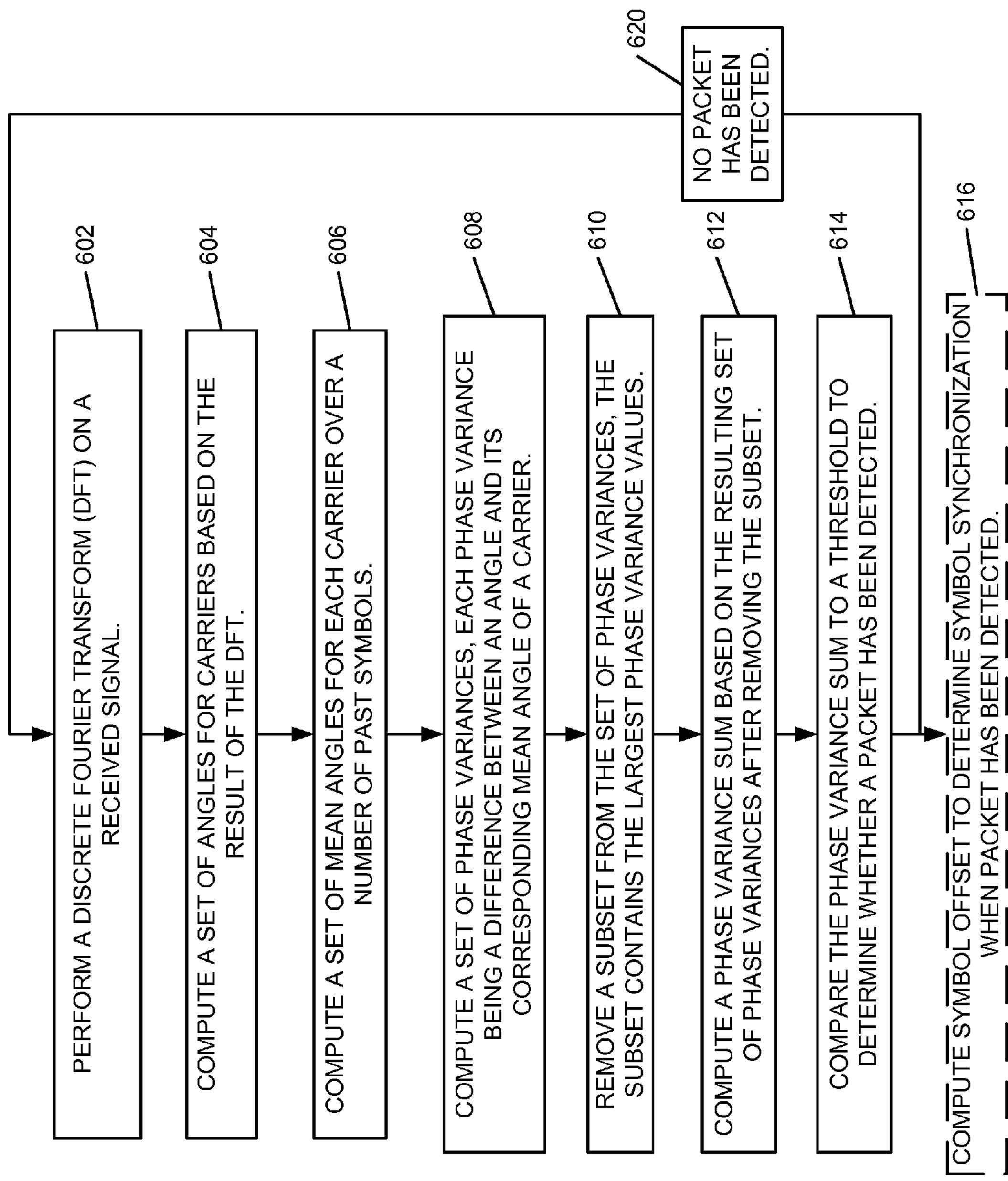
FIG. 6 illustrates a process of MCM packet detection according to one embodiment of the invention.

FIG. 6 illustrates a process of MCM packet detection according to one embodiment of the invention. Method 600 may be implemented in an MCM receiving system such as a PLC modem or any other system that shares characteristics of a PLC system. Method 600 discloses a step-by-step process to implement method 500 for illustration purpose and it is not meant to be the only way implementing method 500.

Method 600 starts at reference 602 with performing a discrete Fourier transform (DFT) at a received signal. The signal may be obtained by sampling the transmission channel at a rate $f_s=N/T_s$ where $T_s$ is the computed (non-extended) symbol time. The sampling frequency $f_s$ and the binary integer N are chosen such that the resulting resolution of a Discrete Fourier Transform (often implemented with a fast Fourier Transform (FFT)) of N samples sampled at $f_s$ equals the MCM carrier spacing. When an FFT is utilized, the method collects N consecutive samples and performs an N-point FFT on the sample set. This produces a set of $n_c$ complex values for the ith symbol:

$$\gamma_{k,i}=A_{k,i}e^{j(2\pi f_0 kr+\theta_{k,i})}$$

for $k=c_0$ to $c_0+n_c-1$.

Then at reference 604, a set of angles is computed:

$$\alpha_{k,i}=2\pi f_0 kr+\theta_{k,i}$$

each $\alpha_{k,i}$ is for a $\gamma_{k,i}$ by taking the arctangent of the ratio of the real and imaginary components of the FFT output for those $n_c$ frequency bins that are MCM carriers. Note that this angle should be modulo $2\pi$.

Onward to reference 606, the method computes a set of mean angles, $M_k$, and each mean angle is for a carrier computed over a number of past symbols. $M_k$ may be defined as the angle formed from the means of the real and imaginary components of $\gamma_{k,i}$, or mathematically expressed as:

$$M_k = \text{atan2}^{-1}\left(\frac{\sum_{i=0}^{-n_s+1}\text{imag}(\gamma_{k,i})}{\sum_{i=0}^{-n_s+1}\text{real}(\gamma_{k,i})}\right)$$

where a tan 2 gives the four quadrant arctangent angle and i is taken from $n_s-1$ symbols ago till the current symbol.

Then at reference 608, the method computes a set of phase variances, $D_k$, each phase variance being a difference between an angle and its corresponding mean angle. There are a variety of ways known in the art to compute the set of phase variances. For example, the phase variances can be a root mean square (RMS) value of difference of phases of a carrier in different symbol durations in one embodiment. In another embodiment, an absolute value of differences of phases of the carrier is used, i.e., $$D_k=\Sigma_{i=0}^{-n_s+1}\text{abs}(\alpha_{k,i}-M_k)$$

At reference 610, the method removes a subset of phase variances from the set of computed phase variances. The subset may include the phase variances with largest values, denoted as $D_{max1}$ and $D_{max2}$, which corresponding to carriers $C_{max1}$ and $C_{max2}$. More or less phase variances may be removed depending on implementation.

Then at reference 612, the method computes a phase variance sum, $D_{sum}$, based on the resulting set of phase variances after removing the subset. The phase variance sum may be computed in a variety of ways based on the resulting set of phase variances. For example, it may be computed using a weighted average of the resulting set of phase variances.

At reference 614, the phase variance sum is compared to a threshold to determine whether a packet has been detected. If the phase variance sum is below the threshold, the method determines that a packet is detected. The closer to zero the value of the phase variance sum is, the higher the probability that a valid packet is detected. If the phase variance sum is higher than the threshold, it is determined that a packet has not been detected at reference 620. Then steps between references 602 to 614 are repeated for next sample of the channel.

Once it is determined that a packet has been detected. Optionally method 600 continues at reference 616 to compute a symbol offset. The computation starts with computing the $(n_c-1)$ angular differences $(\alpha_{k+1}-\alpha_k)$ between adjacent frequency bins. Then the method may subtracts the adjacent carrier reference angle differences from the calculated angular differences:

$$d_m=(\alpha_{k+1}-\alpha_k)-(\theta_{k+1}-\theta_k)$$

Where m and k are defined as m=0 to $n_c-1$ and $k=c_0$ to $c_0+n_c-1$. Note in some embodiments, the angular differences are not computed between adjacent frequency bins. It is desirable in systems with smaller carrier sets as available carriers are more limited.

Then a mean angular difference is computed. In one embodiment, the mean angular difference D is defined as the angle formed from the means of the real and imaginary components of $d_m$:

$$D=\text{atan}2^{-1}\left(\frac{\sum_{m=0}^{n_c-2}\cos(d_m)}{\sum_{m=0}^{n_c-2}\sin(d_m)}\right)$$

where a tan 2 gives the four quadrant arctangent angle of the sum which leaves out a subset of the angular differences associated with bins having the largest phase variances.

The symbol offset indicates a number of sample points from a beginning of a symbol. The symbol offset, designated as $O_s$, is computed through:

$$O_s=\frac{D*N}{2\pi}$$

Figure 7:
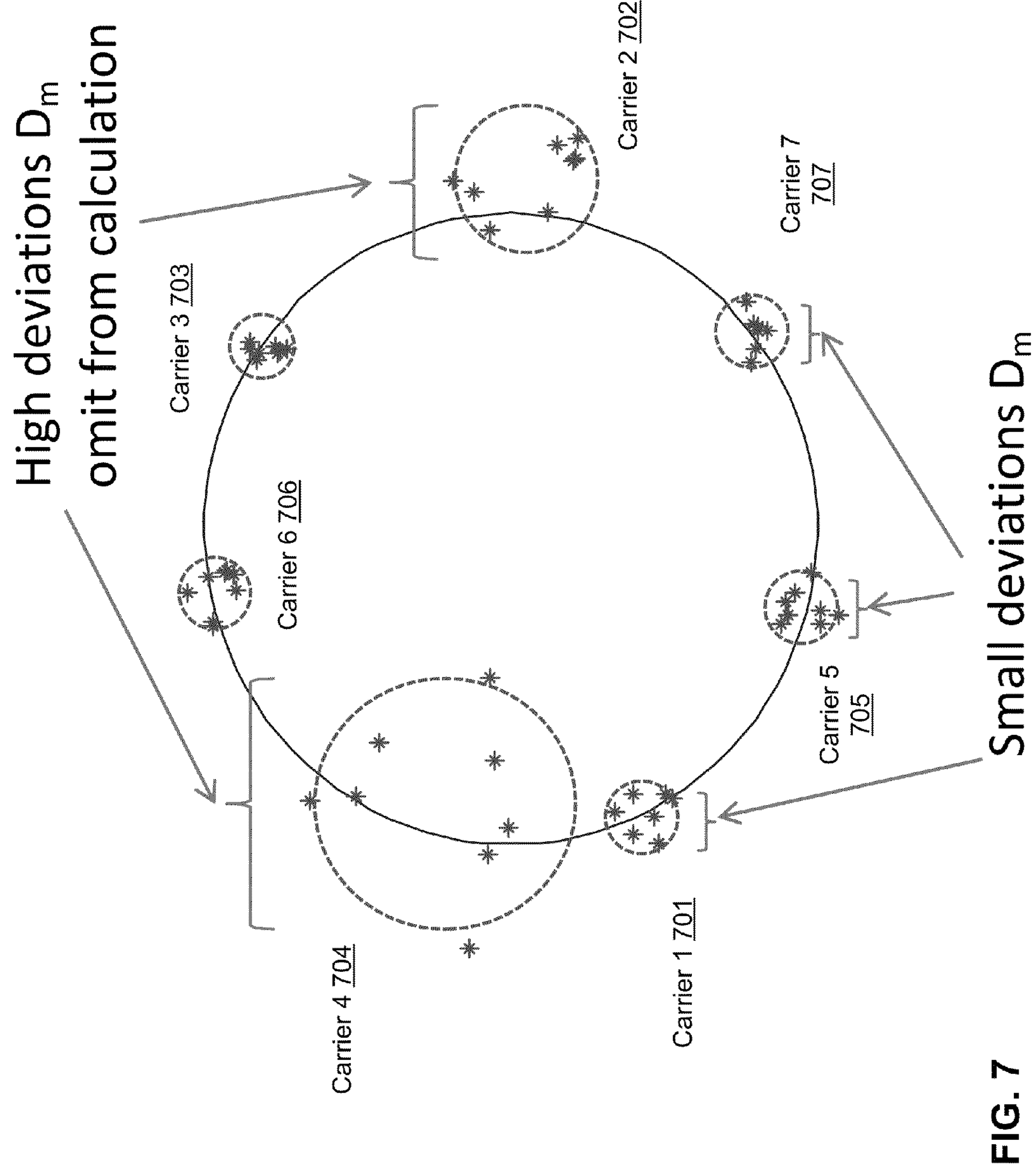
FIG. 7 illustrates a snapshot of phases of carriers of a single symbol for several symbol durations of a live OFDM receiving system according to one embodiment of the invention.

FIG. 7 illustrates a snapshot of phases of carriers of a single symbol for several symbol durations of a live OFDM receiving system according to one embodiment of the invention. The OFDM receiving system contains a seven-carrier OFDM packet preamble. The phases of carriers are the aggregation of eight symbol durations for a valid packet preamble. The asterisks show the relative amplitudes and phases of the seven carriers for the last eight symbol times. Note that some carriers have a much higher deviation than the other carriers, so those carriers (carriers 2 and 4 at references 702 and 704 in FIG. 7) will be excluded from the computation of a phase variance sum in one embodiment. The relatively constant phases for each carrier are unique to having receiving a valid OFDM packet and the condition for a valid carrier detection indication.

Figure 8:
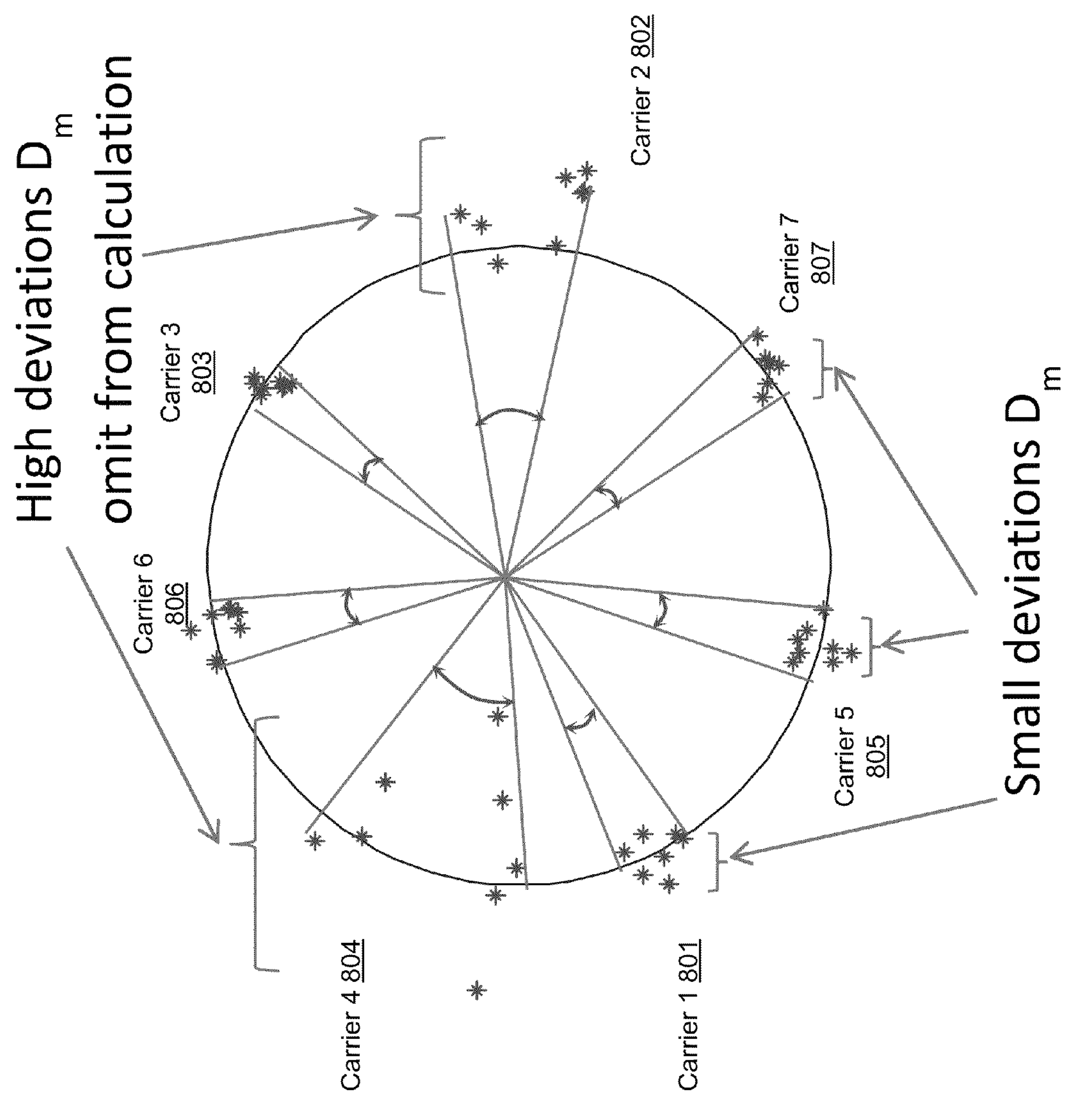
FIG. 8 illustrates a snapshot of phase measurements of carriers of a single symbol for several symbol durations of a live OFDM receiving system according to one embodiment of the invention.

FIG. 8 illustrates a snapshot of phase measurements of carriers of a single symbol for several symbol durations of a live OFDM receiving system according to one embodiment of the invention. The OFDM receiving system contains a seven-carrier OFDM packet preamble. The phases of carriers are the aggregation of eight symbol durations for a valid packet preamble. The asterisks show the phases of the seven carriers for the last eight symbol times. Here the carriers with high deviation (carriers 2 and 4 at references 802 and 804 in FIG. 8) will be excluded from the computation of a phase variance sum in one embodiment. Note that while FIGS. 7 and 8 use living OFDM receiving systems to illustrate packet detection according embodiments of the inventions, a non-OFDM MCM receiving system can utilize packet detection utilizing embodiments of the invention as well.

Figure 9:
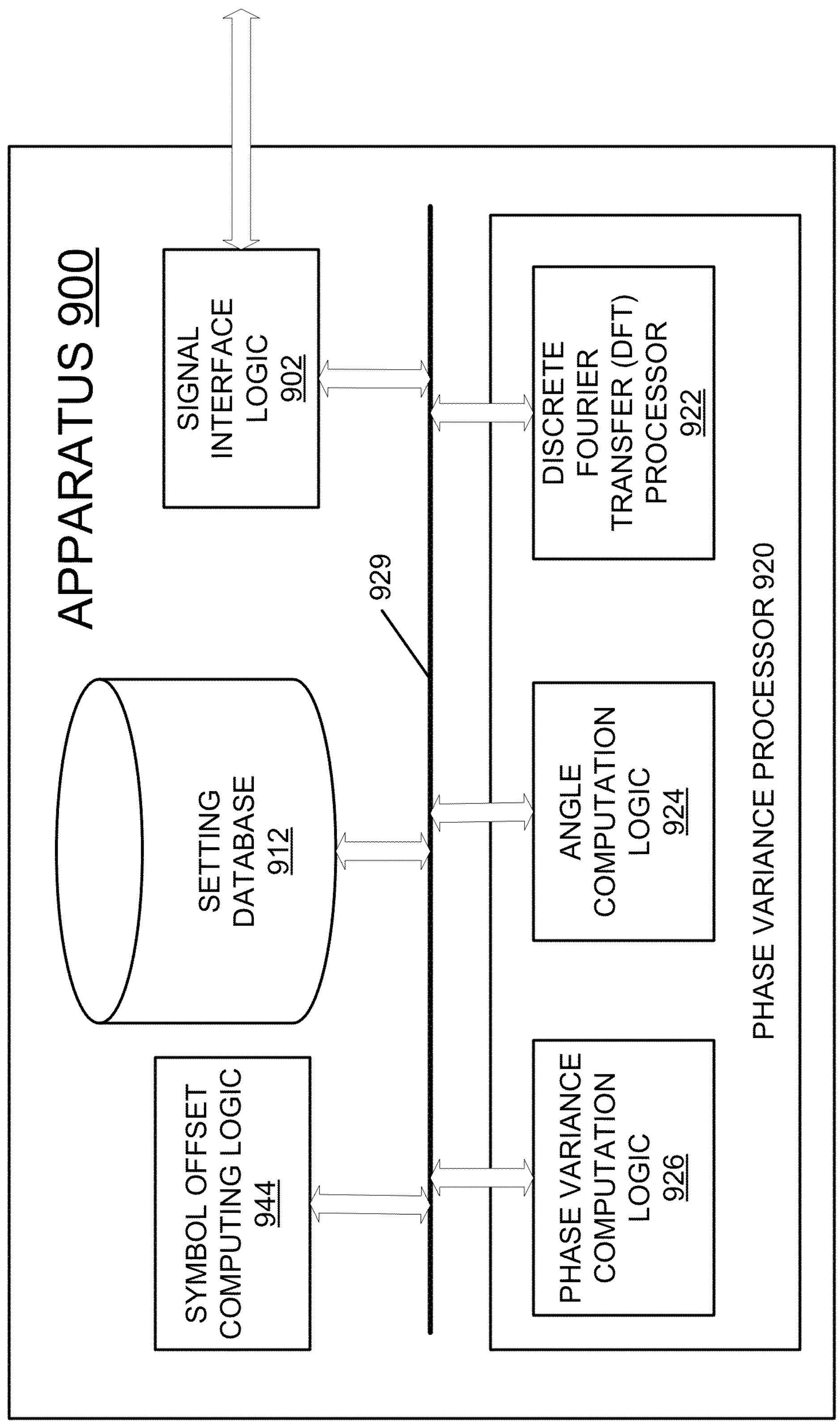
FIG. 9 illustrates an apparatus implementing the packet detection and synchronization methods according to an embodiment of the invention.

FIG. 9 illustrates an apparatus implementing the packet detection and synchronization methods according to an embodiment of the invention. Apparatus 900 is implemented as an MCM receiving system. The MCM receiving system may be a part of an MCM system (e.g., an OFDM system) utilizing a transmission channel of a power line, a radio frequency channel, an optical fiber, or a copper line, depending on implementation. When the transmission channel is a power line, the MCM system complies with CENELEC standards in one embodiment. In the MCM system, traffic is modulated as packets and transmitted packets include preamble for packet detection. The preamble for each packet consists of a number of carriers without modulation (i.e., unmodulated carrier), and each carrier contains an initial phase.

Apparatus 900 contains signal interface logic 902, phase variance processor 920, symbol offset computing logic 944, and setting database 912. These modules are communicatively coupled via interconnect 939, which may be a bus connection in one embodiment. Note apparatus 900 contains other modules and logic not shown as they are not essential to embodiments of the invention. The various logics may be implemented as a single unit, or multiple units can combine two or more units within apparatus 900. Not all embodiments of the invention contain all logics disclose herein and some logics are not utilized in some embodiments and they may not be implemented these embodiments. Also, phase variance processor 920 can be general purpose or special purpose processors. The individual logics can contain their dedicated network process units (NPUs) or they can share NPUs among multiple logics.

In one embodiment, phase variance processor 920 comprises discrete Fourier transfer (DFT) processor 922, angle computation logic 924, and phase variance computation logic 926. In one embodiment, DFT processor 922 is implemented with a fast Fourier transform (FIT). Angle computation logic 924 is configured to compute a set of angles from a set of carriers. Angle computation logic 924 is also configured to compute a set of mean angles, one for each carrier of the set of carriers. Phase variance computation logic 926 is configured to compute a set of phase variances based on the resulting sets of angles and mean angles from angle computation logic 924.

Signal interface logic 902 is configured to monitor and accept for signals at a transmission channel of an MCM system. Signal samples interface logic 902 is configured to sample the transmission channel to detect any incoming MCM packet (e.g., an OFDM packet) in one embodiment. The received signal from signal interface logic 902 is forwarded to phase variance processor 920 for packet detection.

In one embodiment, the received signal is first processed through discrete Fourier transfer (DFT) processor 922. In one embodiment, a FFT is performed on the received signal. The result data after being processed through DFT processor 922 is forwarded to angle computation logic 924. Angle computation logic 924 is configured to calculate a set of angle values for carriers of the received signal for several symbol durations. In addition, angle computation logic 924 is configured to calculate a mean angle for each carrier over the several symbol durations. The mean angles can be defined in a variety of ways as discussed herein above. Angle computation logic 924 then forwards a set of phase variances to phase variance computation logic 926.

The set of phase variances is derived from a variance of the set of angles from their mean angles. In one embodiment, a subset of the set of phase variances is removed from the set, where the subset includes ones with the largest phase variances. Then phase variance computation logic derives a phase variance sum from the remaining values of the set of the phase variances. The phase variance sum is then used to compare with a threshold value stored in setting database 912 to determine if a packet has been detected. If the phase variance sum is lower than the threshold value, it's determined that a packet has been detected. Otherwise, the process continues at signal interface logic to obtain the next signal.

Once a packet has been detected, symbol offset computing logic 944 is configured to determine the symbol offset to synchronize with the packet. The symbol offset indicates a number of sample points from the beginning of a symbol. The symbol offset is calculated though forming a weighted average of phase differences between some number of carriers in the preamble. For example, the phase differences can be a set of phase differences between adjacent carriers in the preamble.

The operations of the flow diagram are described with reference to the exemplary embodiment of FIG. 9. However, it should be understood that the operations of flow diagrams can be performed by embodiments of the invention other than those discussed with reference to FIGS. 5 and 6, and the embodiments discussed with reference to FIG. 9 can perform operations different than those discussed with reference to the flow diagrams of FIGS. 5 and 6.

Different embodiments of the invention may be implemented using different combinations of software, firmware, and/or hardware. Thus, the techniques shown in the figures can be implemented using code and data stored and executed on one or more electronic devices (e.g., an end system, a network device). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A machine-implemented method of detecting packets at a receiving system in a Multi-Carrier Modulation (MCM) system, wherein packets are transmitted through the MCM system, wherein each transmitted packet includes a preamble for packet detection, wherein the preamble for each packet consists of a plurality of carriers without modulation, and wherein the plurality of carriers are transmitted in a plurality of symbol durations, the method comprising:

receiving a signal at the receiving system;

obtaining a set of phases of the signal for each symbol duration in the plurality of symbol durations, wherein each phase is a phase of a carrier of the plurality of carriers;

obtaining a set of phase variances for each carrier of the plurality of carriers, wherein each phase variance is a difference of phases of a carrier in different symbol durations, wherein a phase variance of a carrier is derived using a mean phase of the carrier computed over a plurality of past symbols;

computing a phase variance value based on the set of phase variances, wherein the computing the phase variance value includes selecting a subset of the set of phase variances, wherein the subset of the set of phase variances is selected by excluding phase variances of one or more carriers of the plurality of carriers from computing the phase variance value; and comparing the phase variance value with a threshold to determine whether a packet has been detected from the received signal.

2. The machine-implemented method of claim 1, wherein each phase variance of the set of phase variances is a difference of phases of the carrier in adjacent symbol durations.

3. The machine-implemented method of claim 1, wherein each phase variance of the set of phase variances is an absolute value of differences of phases of the carrier in different symbol durations.

4. The machine-implemented method of claim 1, wherein each phase variance of the set of phase variances is a root mean square (RMS) value of differences of phases of the carrier in different symbol durations.

5. The machine-implemented method of claim 1, wherein the computing the phase variance value includes forming a weighted average of the set of phase variances.

6. The machine-implemented method of claim 5, wherein the computing the phase variance value includes computing a deviation from the weighted average of the set of phase variances.

7. The machine-implemented method of claim 1, wherein a number of carriers of the plurality of carriers is no more than 18.

8. The machine-implemented method of claim 1, wherein the MCM system is a power line communication (PLC) system.

9. The machine-implemented method of claim 8, wherein the PLC system utilizes frequency bands within 95-140 kHz in compliance with the European Committee for Electro technical Standardization (CENELEC) standards.

10. The machine-implemented method of claim 1, further comprising computing a symbol offset in response to a determination that a packet has been detected, wherein the symbol offset indicates a number of sample points from a beginning of a symbol.

11. The machine-implemented method of claim 10, wherein the computing the symbol off set includes forming a weighted average of phase differences between pairs of some number of carriers in the preamble.

12. The machine-implemented method of claim 1, wherein the MCM system is an orthogonal frequency-division multiplexing (OFDM) system.

13. An apparatus implemented as a receiving system in a Multi-Carrier Modulation (MCM) system, wherein traffic is modulated as packet transmitted through the MCM system, wherein each transmitted packet includes a preamble for packet detection, wherein the preamble for each packet consists of a plurality of carriers without modulation, and wherein each carrier contains an initial phase, the apparatus comprising:

a signal interface logic configured to receive signals;

a phase variance processor configured to obtain a set of phases of the signal for each symbol duration, wherein each phase is a phase of a carrier of the plurality of carriers during the plurality of a symbol duration, obtain a set of phase variances for each carrier of the plurality of carriers, wherein each phase variance is a difference of phases of a carrier in different symbol durations, wherein a phase variance of a carrier is to be derived using a mean phase of the carrier computed over a plurality of past symbols, compute a phase variance value based on the set of phase variances, wherein computation of the phase variance value includes selecting a subset of the set of phase variances, wherein the subset of the set of phase variances is to be selected by excluding phase variances of one or more carriers of the plurality of carriers from computing the phase variance value, and compare the phase variance value with a threshold to determine whether a packet has been detected from the received signal; and a setting database configured to store the threshold.

14. The apparatus of claim 13, wherein each phase variance of the set of phase variance is a difference of phases of the carrier in adjacent symbol durations.

15. The apparatus of claim 13, wherein the computation of the phase variance value includes forming a weighted average of the set of phase variances.

16. The apparatus of claim 15, wherein the computation the phase variance value includes computing a deviation from the weighted average of the set of phase variances.

17. The apparatus of claim 13, wherein a number of carriers of the plurality of carriers is no more than 18.

18. The apparatus of claim 13, wherein the MCM system is a power line communication (PLC) system.

19. The apparatus of claim 18, wherein the PLC system utilizes frequency bands within 95-148.5 kHz in compliance with the European Committee for Electro technical Standardization (CENELEC) standards.

20. The apparatus of claim 13, further comprising:

a symbol offset computing logic configured to compute a symbol offset in response to a determination that a packet has been detected, wherein the symbol offset indicates a number of sample points from a beginning of a symbol.

21. The apparatus of claim 20, wherein the computing the symbol offset includes forming a weighted average of phase differences between pairs of some number of carriers in the preamble.

22. The apparatus of claim 13, wherein the MCM system is an orthogonal frequency-division multiplexing (OFDM) system.

* * * * *